United States Patent

Beck

[15] 3,651,722
[45] Mar. 28, 1972

[54] MECHANISM FOR CUTTING THREADS USING A TAPE CONTROLLED AUTOMATIC MACHINE

[72] Inventor: Maurice E. Beck, Fort Wayne, Ind.
[73] Assignee: Kunkle Valve Company Inc., Fort Wayne, Ind.
[22] Filed: Mar. 4, 1970
[21] Appl. No.: 16,405

[52] U.S. Cl. .................................................. 82/5
[51] Int. Cl. ........................................... B23b 5/46
[58] Field of Search ................................ 82/5, 5.5

[56] References Cited

UNITED STATES PATENTS

| | | | |
|---|---|---|---|
| 3,501,984 | 3/1970 | Hofmann | 82/5 |
| 3,420,126 | 1/1969 | Renoux | 82/5 |
| 2,920,332 | 1/1960 | Helmke | 82/5 |

Primary Examiner—Leonidas Vlachos
Attorney—Russell H. Clark

[57] ABSTRACT

The invention contemplates an automatic machine of the tape controlled type for cutting threads on a rotating workpiece by a single pass of the cutting tool or by a multiple of passes. A combination ratchet and cam member is provided for projecting the tool for depth of cut and for withdrawing the tool at the completion of a thread cutting pass. The tape contains certain commands punched into the tape for controlling displacement, feed etc., and the invention provides a sensing part which rotates with the workpiece and a stationary part containing a proximity switch which is magnetically influenced by the sensing part on each revolution. When the cutting tool has been positioned close to the workpiece, the threading feed is picked up and the tool is fed forwardly for a relatively short distance and then dropped out accurately. This is a required preliminary step prior to actuation of the proximity switch the closing of which assures that the thread cutting operation will start at the same exact spot on the workpiece for all passes of the tool.

8 Claims, 10 Drawing Figures

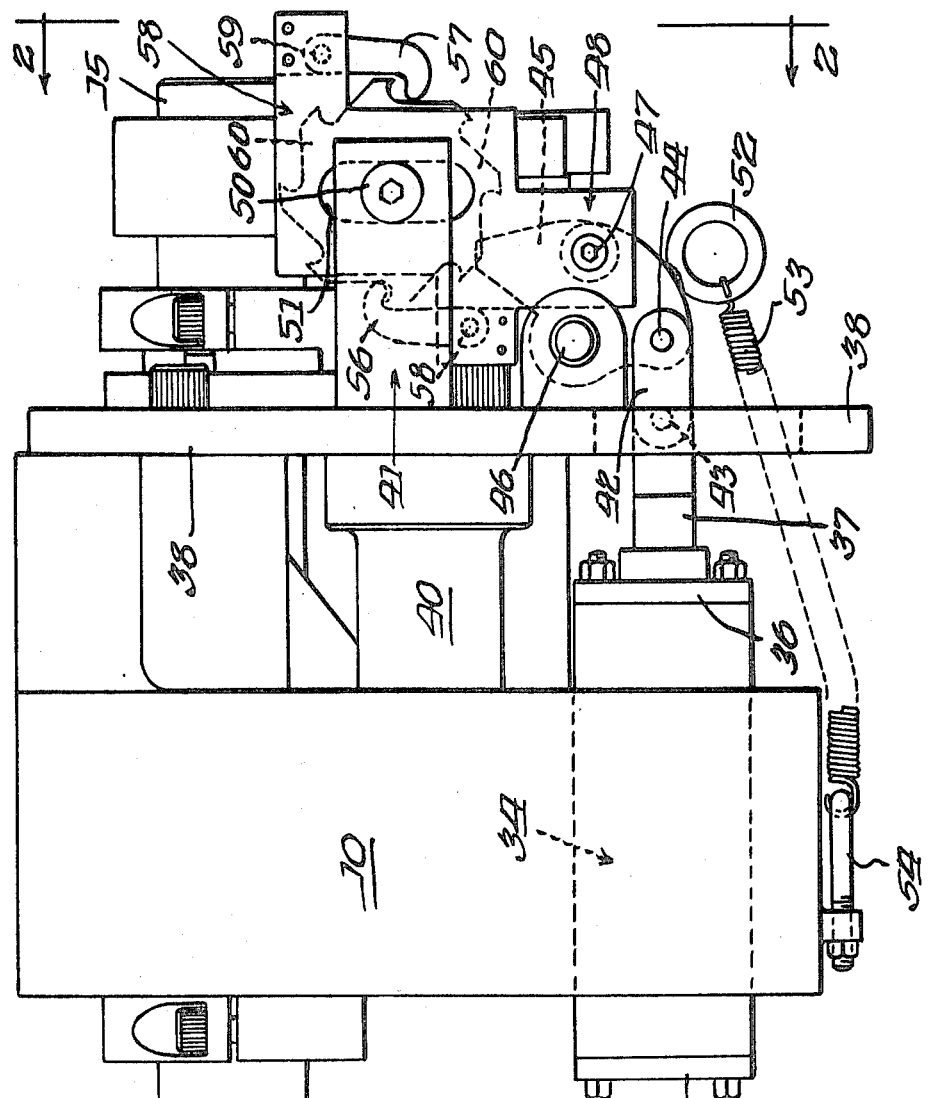
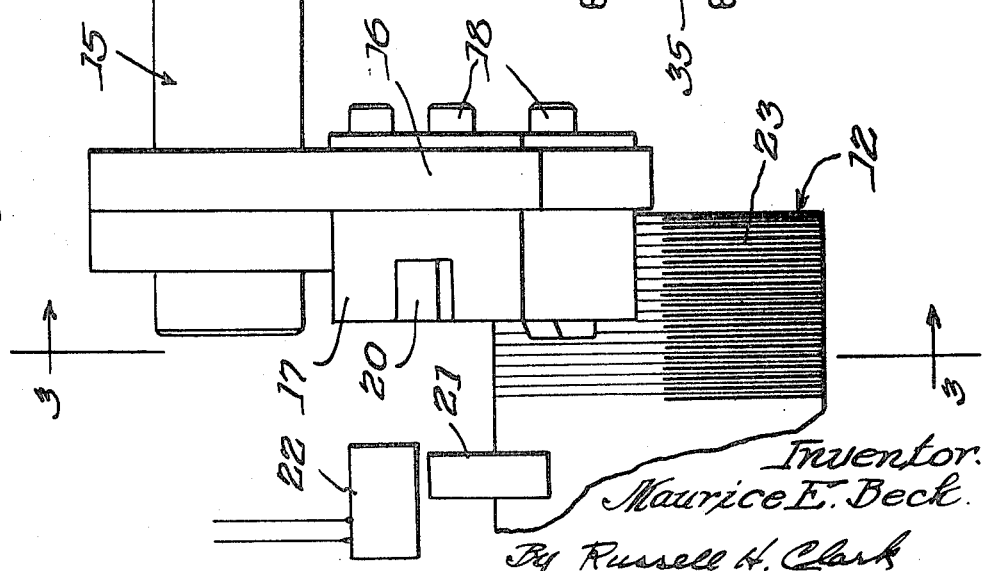
Fig. 1.
Inventor.
Maurice E. Beck.
By Russell H. Clark
Atty

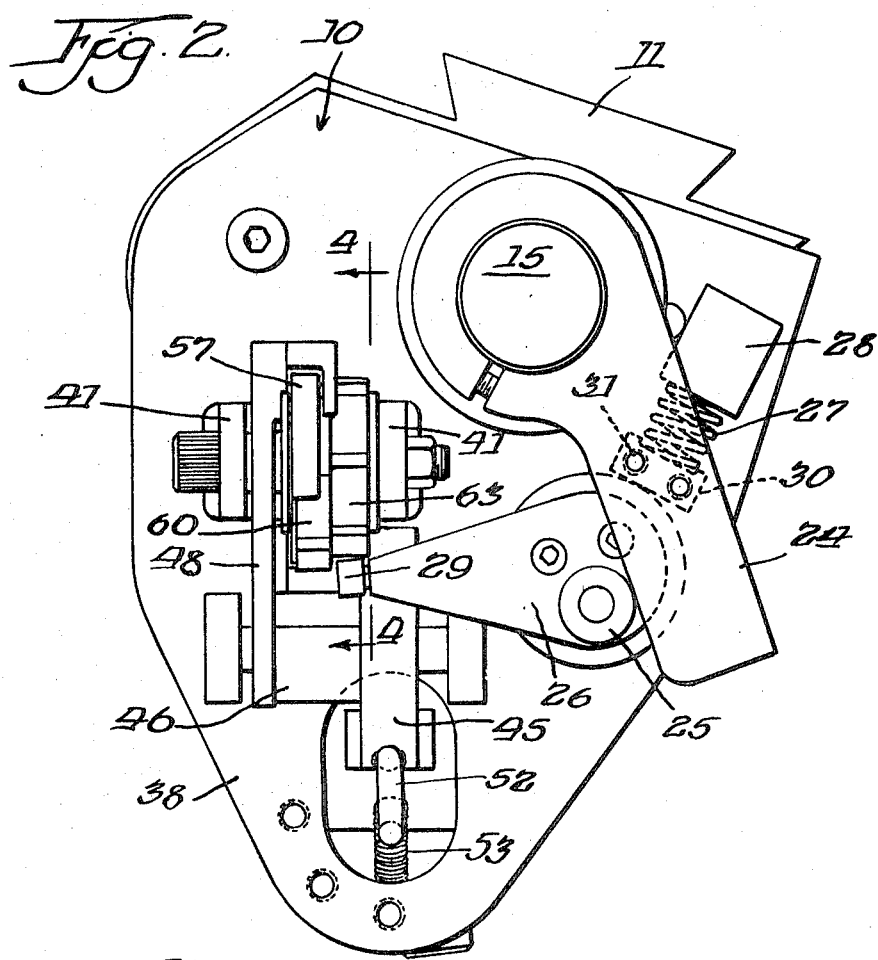
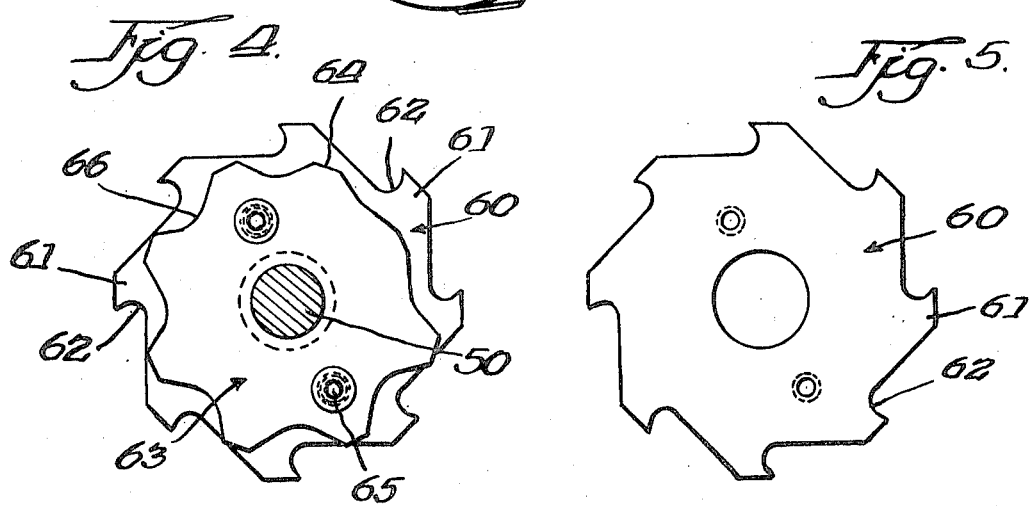

PATENTED MAR 28 1972 3,651,722
SHEET 3 OF 4
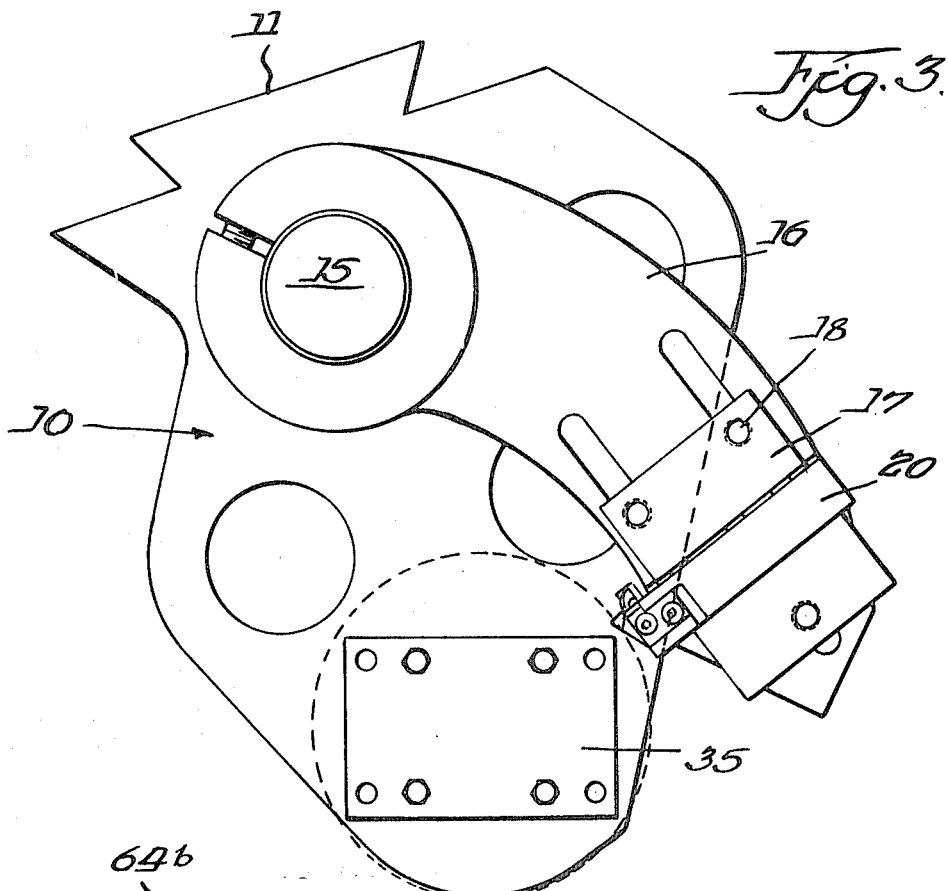
Fig. 3.
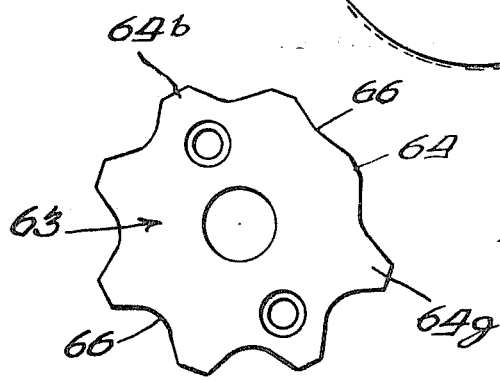
Fig. 6.
Fig. 7.
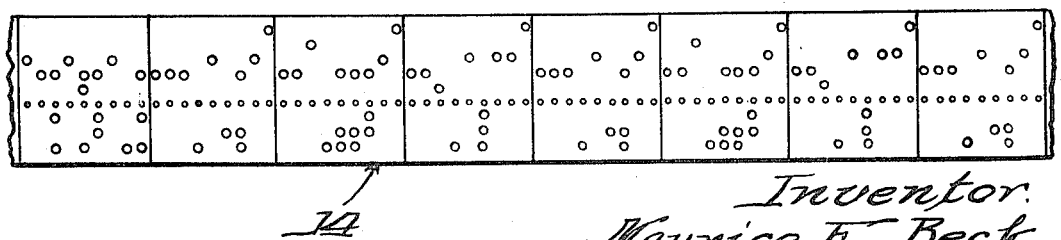
Inventor:
Maurice E. Beck.
By Russell H. Clark
Atty.

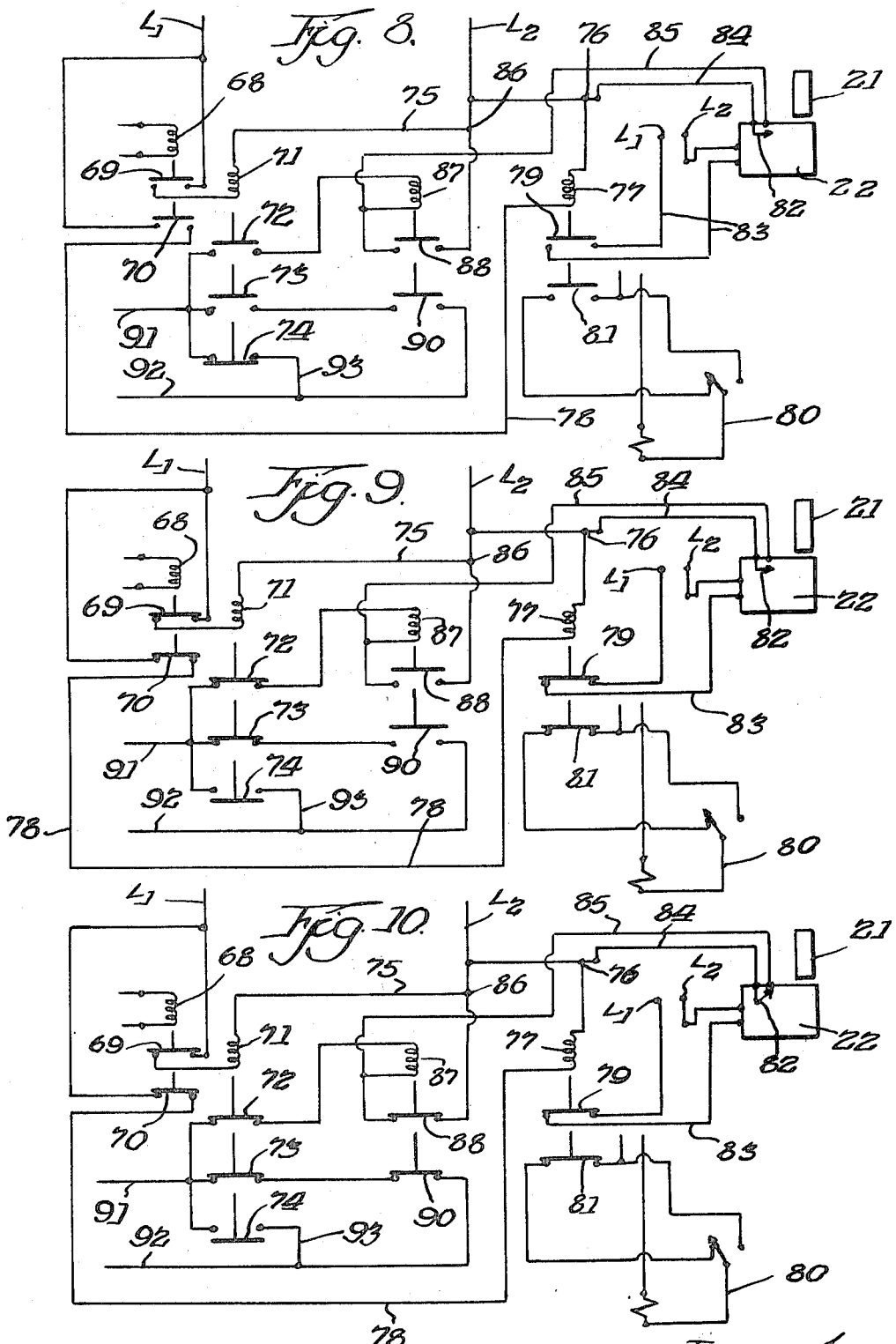

MECHANISM FOR CUTTING THREADS USING A TAPE CONTROLLED AUTOMATIC MACHINE

The invention relates to the cutting of threads on a workpiece using a tape controlled automatic machine and has reference in particular to a method and to apparatus for picking up the thread lead and then threading a workpiece using a tape controlled automatic machine.

The basic objective of the invention is to provide apparatus for cutting threads on a workpiece by a single pass or by a multiple of passes all controlled by one or more extra brush contacts in the tape reader of the automatic machine, and wherein relays and a sensing device are employed for obtaining the exact location of the workpiece for starting the thread cutting operation, together with an in combination with mechanism for holding the cutting tool and mechanism for advancing and backing out the tool and which may be actuated mechanically, hydraulically or electrically in addition to being tape controlled.

In actual operation of the tape controlled machine as contemplated by the invention, the surface of the workpiece to be threaded is turned or machined and then the surface is cut to form the threads by a single pass or by multiple passes of a thread cutting tool.

In view of the foregoing a further object of the invention is to provide a tool holder which will be carried by a movable arm or slide for holding the thread cutting tool rigid but which will be suitably actuated as required for the cutting movement of the tool and also for backing out of the tool and feeding in for progressive cuts.

A further object resides in the provision of novel mechanism for effecting and for controlling movement of the movable arm and which will include cam and ratchet means for advancing the tool for depth of cuts and for backing out the tool, and wherein a power cylinder using air or hydraulic pressure is preferred for actuating the ratchet means.

A further objective of the invention resides in the provision of a proximity switch located adjacent the workpiece and which is closed at a precise rotative position of the workpiece so as to start the threading operation at the same exact spot on the workpiece for all passes of the cutting tool.

Another object of the invention is to provide a method of the character described for cutting threads using a tape controlled machine and wherein a certain block on the tape will call for a feed of the cutting tool in a forward direction for a threading operation and which ia then dropped out accurately as a preliminary step prior to actuation of the proximity switch. The proximity switch which may comprise a limit switch, a magnetically actuated switch, a photoelectric cell or the like, will pick up the feed of the thread at the precise rotative position of the workpiece and the feeding is continued until a tape advance occurs to call for and end to the thread cutting pass. A backing out of the cutting tool thereupon takes place followed by a rapid travel of the tool in a rear direction to beyond the workpiece. The operation is repeated if the next block on the tape calls for a thread cutting pass.

With these and other objects in view, the invention may consist of certain novel features of construction and operation as will be more fully described and particularly pointed out in the specification, drawings and claims.

In the drawings which illustrate an embodiment of the invention and wherein like reference characters are used to designate like parts, FIG. 1 is a front elevational view, as seen by the operator, showing the workpiece, the tool holder, the turret threading head and the cam and ratchet mechanism all associated in an operative combination as contemplated by the invention;

FIG. 2 is an end elevational view of the mechanism as seen on line 2—2 of FIG. 1 looking in the direction of the arrows;

FIG. 3 is an end elevational view of the mechanism as seen on line 3—3 of FIG. 1 looking in the direction of the arrows;

FIG. 4 is a detail sectional view taken on line 4—4 of FIG. 1 showing the cam and ratchet combination.

FIG. 5 is an elevational view of the ratchet;

FIG. 6 is an elevational view of the cam;

FIG. 7 shows a portion of the tape including several blocks with openings therein at predetermined locations for automatically controlling the present apparatus for a thread cutting operation; and FIGS. 8, 9 and 10 show electrical diagrams which illustrate the improved operation of the apparatus as contemplated by the invention.

Reference is made to the drawings which show parts of a tape controlled automatic machine together with the improvements contemplated by the present invention. The turret of the machine is not shown. However the turret is caused to travel horizontally for a facing, boring or thread cutting operation all of which is conventional and the said turret is also indexed in the well known manner for different operations on the workpiece. The threading head 10 shown in FIGS. 1, 2 and 3 is provided with a keystone projection 11 which is employed in affixing and securing the threading head to the horizontally movable turret. Accordingly it will be understood that the threading head 10 will travel towards and from the workpiece 12 in FIG. 1, when such movements are caused by the commands punched into the the various blocks of the type 14 generally represented for illustrative purposes in FIG. 7. One such command which is punched into a certain block of the tape is RTF namely, rapid traverse forward and which causes the threading head to move from its far out right hand position to a position towards and close to the workpiece. A similar command RTR namely, rapid traverse reverse is also punched into a certain block of the tape and which will move the threading head from its position at the end of a thread cutting pass to its right hand position beyond the workpiece. The other commands such as displacement will control the RTF and the RTR movements and still other commands will control the speed of travel and in particular the speed of travel during the thread cutting operation which of course must be correlated with the speed of rotation of the particular spindle carrying the workpiece. In view of the foregoing, it will be clear that a tape advance will bring into actuation certain functions of the threading head 10 and which will take place in a predetermined order for the desired control of the threading operation and the selection of the desired number of passes.

The threading head suitably journals a tool holder shaft which projects a distance from either side of the threading head. As shown in FIGS. 1 and 3 the arm 16 is fixedly secured to the shaft 15 and said arm in turn carries the tool holder 17 which is secured to the depending end of the arm by the securing bolts 18. The cutting tool 20 for cutting the threads on the workpiece 12 is fixedly and securely held by the tool holder 17.

The workpiece 12 is held in the conventional manner by a chuck carried by and rotated by a spindle neither of which are shown since the same are not necessary for an understanding of the invention. However it will be understood that either the chuck, spindle or the workpiece will carry a small block of soft steel such as 21 FIGS. 8, 9 and 10, and which has magnetic influence with means located in the switch housing 22. Whereas the steel block revolves with the workpiece, the switch housing is stationary. As the steel block passes close to the housing it triggers certain mechanism within the housing and causes the proximity switch to close. Thus the proximity switch 82 within the housing 22 is always actuated to close at the same precise rotative position of the workpiece for cutting the threads and as a result, the cutting tool 20 can make a number of passes for cutting the threads 23 on the workpiece 12 to the proper depth.

The extension of the tool holder shaft 15 on the right hand side of the threading head 10, FIG. 1, has the actuating arm 24 fixedly secured thereto as shown in FIG. 2 and said arm contacts the roller 25 eccentrically carried by the actuating lever 26. The arm 24 is resiliently held in contact with the eccentric roller 25 by the coil spring 27 which is backed at its upper end by the block 28 fixed to the threading head and has contact at its lower end with the block 30 fixed to the arm 24 by the screws 31. Oscillation of the actuating lever 26 will cause the eccentric roller 25 to alternately raise and lower the actuating arm 24 thereby oscillating the tool holder shaft 15. This oscillation of the tool holder shaft will in turn oscillate the arm 16 for moving the tool 20 into contact and out of contact with the workpiece. The ratchet and cam mechanism for actuating the lever 26 will now be described.

The threading head 10 retains and positions the power cylinder 34 which is closed at one end by the plate 35 and at its rear end by the plate 36 through which passes the piston rod 37. The head 10 also retains the support plate 38 which is primarily fixed to the head by the supporting part 40. The frame holder 41 is fixed to the support plate 38 and the said frame holder projects outwardly therefrom. The piston rod 37 of the power cylinder 34 has the clevis connection 42 joined thereto at 43 and said clevis is in turn connected at 44 to the rocker arm 45. The rocker arm is journalled for oscillation at 46, the said pivot shaft being mounted in bearing members extending from the support plate 38. The rocker arm has a pivotal connection at 47 with the vertically reciprocable slide 48 which is supported by the frame holder 41 for reciprocating movement by means of the bushing shaft 50 which extends through and has location in the elongated opening 51 formed in the slide. Actuation of the piston rod 37 towards the right, FIG. 1, will rock the arm 45 on the pivot axis 46 and the slide 48 will be elevated due to its connection at 47 with the arm. Whereas this up movement of the slide 48 is effected by the power cylinder, down movement of the slide takes place since the arm is connected by the ring 52 with the coil spring 53 which is anchored at its opposite end to the threading head 10 by the adjustable bolt 54.

This up and down reciprocating movement of the slide 48 is transmitted to two reversely oriented ratchet pawls 56 and 57. Both pawls are carried by the slide 48. Pawl 56 is pivoted to the slide at 58, whereas pawl 57 is pivoted to the slide at 59. The bushing shaft 50 journals a pair of members as best shown in FIG. 4 with the members being individually shown in FIGS. 5 and 6. The member 60 consists of a ratchet plate having teeth 61 formed on its periphery to provide the recesses 62. The member 63 consists of a cam plate having the cam projections 64 formed on its periphery. The plates are secured to each other in juxtaposed relation by the securing screws 65 and are supported as a unit on and are rotatable with the bushing shaft 50. The said shaft extends between and connects the two frame holders 41 and also positions the slide 48 which has the elongated opening 51 therein for receiving the bushing shaft. Further as regards the cam plate it will be observed that the cam projections 64 have varying height with the cam projection 64g having the maximum height. Recesses 66 are formed in the cam plate between the projections.

Admitting a pressure fluid to cylinder 34 will project the piston rod 37 towards the right FIG. 1, and the rocker arm 45 will be oscillated counter-clockwise about the axis 46. Due to the connection at 47 the rocker arm will move the slide 48 in an upward direction such as will cause the pawl 57 to engage the ratchet wheel 60 and index the said wheel. This indexing of the ratchet wheel is sufficient to rotate the cam 63 which is fixed to the ratchet wheel and movement of the actuating lever 26 is caused to take place. This movement of the lever 26 is transmitted to the tool 20 and the tool is projected for contact with the workpiece 12 for a thread cutting operation. The extent of projection of the tool will depend on the height of the cam projection 64 caused to contact the roller 29 on the lever 26. At the start of a thread cutting operation the ratchet and cam combination unit is so actuated as to cause the cam projection 64 of minimum height to contact the roller 29. As additional passes take place the remaining cam projections are utilized to cause the tool 20 to cut a progressively deeper thread.

When the pressure medium is released from the power cylinder 34, the coil spring 53 will take over and return the rocker arm 45 and the slide 48 to initial position as shown in FIG. 1. The down movement of the slide 48 will render the pawl 56 operative to turn the ratchet wheel 60 and to thus turn the cam plate 63 for locating the roller 29 in a recess 66 in the cam plate. The tool is accordingly withdrawn and a rapid travel of the tool to the rear can now take place in preparation for the next pass.

In describing the electrical diagrams shown in FIGS. 8, 9 and 10, an attempt will be made to correlate the operations of the apparatus of FIGS. 1, 2 and 3 with the advance of the tape 14 block by block through the tape reader of the apparatus.

The coil 68 has the contactors 69 and 70 which are shown in FIG. 8 in de-energized position. The coil 68 is energized by the tape reader when the tape 14 calls for such a function. With the coil 68 de-energized the contactors 69 and 70 maintain the power circuit L1 and L2 in an open state. Coil 71 is also de-energized in FIG. 8 and its contactors 72 and 73 are open with contactor 74 being closed. From coil 71 the conductor 75 connects at 76 with coil 77 having connection in turn through conductor 78 with terminal L2 when the contactor 70 is closed. The coil 77 has two contactors. The contactor 79 controls the power circuit L1 and L2 to the proximity switch 82 through the conductors 83. The contactor 81 controls the solenoid circuit 80 which in turn will control the admission to and the exhausting of a pressure fluid from the power cylinder 34. When 81 is closed the solenoid is actuated to open a valve and admit the pressure fluid to the cylinder and this actuates the ratchet and cam combination unit so that the tool 20 is projected a distance depending on the height of the cam projection 64 which may contact the roller 29 on the actuating lever 26. When the contactor 81 is open the solenoid exhausts the power cylinder 34 and the cam 63 is again actuated to bring a recess 66 in contact with the roller 29 thus withdrawing the tool.

Referring again to the proximity switch 82, it will be seen that one conductor 84 is connected to the junctions 76 and 86, whereas the other conductor 85 connects with the coil 87. When the coil 87 is energized by a closing of the proximity switch 82, the thread cutting operation is started. The coil has contactors 88 and 90. The contactor 88 controls the circuit to the proximity switch through the conductors 84 and 85. The coil 87 is only momentarily energized by a closing of the switch and thus the contactors 72 and 88 are holding contactors, using terminal 91 and which is connected through the contactors, the coil 87 and conductor 78 with the terminal L2. The second contactor 90 is in series relation with the contactor 73 and the two contactors control the circuit including the conductors 91 and 92 which are part of the circuit to the solenoids of the feed clutches. With 74 being closed the circuit from 91 to 92 is completed by conductor 93. When 74 opens, the circuit including the conductors 91 and 92 for controlling the feed clutches will be open, see FIG. 9, and feeding is terminated until the circuit is again closed by a closing of the contactors 73 and 90 as shown in FIG. 10.

The initial operation in the cutting of a thread such as 23 on the workpiece 12 consists in a tape advance calling for a rapid traverse forward for the tool 20 to a specified displacement as determined by the displacement command on the tape. This displacement will move the tool relatively close to the face of the workpiece. A tape advance will then take place bringing into the reader of the machine the next block of the tape and which will call for a pick up of the thread feed for a short distance in the range of about one-tenth of an inch, whereupon a drop-out of the feed will occur. This dropping out of the feed is accordingly to a command punched into the tape and therefore takes place at an accurate predetermined location of the tool. The tool now has a precise position as regards displacement with respect to the face of the workpiece Following this accurate dropping out of the feed, another tape advance will take place and this will energize the coil 68. In connection with the wiring diagrams of FIGS. 8, 9 and 10 it was explained that when coil 68 is energized by the tape reader the contactors 69 and 70 close and coil 71 is energized. Energization of coil 71 will cause 72 and 73 to close and 74 to open. The circuit 91–92 to the solenoids of the feed clutches is now open and feeding can be initiated only by a closing of the proximity switch 82. The coil 77 is also energized by a closing of the contactors 69 and 70 and thus the contactors 79 and 81 will close. When 79 closes current is supplied to the proximity switch and 81 upon closing will energize the solenoid circuit 80 which controls the admission of and the release of the pressure medium as regards the power cylinder 34. Upon closing of the circuit 80 the pressure medium is admitted to cylinder 34, the piston rod 37 is moved to the right, FIG. 1, and the up movement of the slide 48 will cause the pawl 57 to index the ratchet and cam mechanism. This will bring the cam projection 64 of least height into contact with the roller 29 and lever 26 is rocked to actuate arm 24 FIG. 2, and arm 16, FIG. 3 to project the tool 20 for the first cutting pass.

The circuits of the wiring diagrams as shown in FIGS. 8, 9 and 10 have now been conditioned for actuation of the proximity switch 82. This may be a magnetically actuated switch, a limit switch or a photo-electric cell. A magnetically actuated switch is shown with the soft steel block 21 being fixed to the chuck or to the spindle so as to rotate with the workpiece. With the circuits being conditioned, the said steel block at the precise rotative position of the workpiece will cause the switch 82 to close. This will energize the coil 87 and the contactors 88 and 90 are caused to close. The holding contactor 88 upon closing will function to hold the coil 87 energized together with closed contactor 72 since terminal 91 is now connected to terminal L2. The closing of contactor 90 will close the circuit 91-92 to the solenoids of the feed clutches and feeding of the tool 20 takes place for the first pass in cutting the thread 23 in the workpiece 12.

During the cutting of the thread, the contactors remain in the position as shown in FIG. 10 except that 82 closes only momentarily as it is only briefly influenced by the part 21. The end of the thread cutting pass is determined by the displacement command punched into the tape. When the tool has moved to the left for a distance as determined by the tape, then a tape advance will take place and the next block sensed by the tape reader will de-energize the coil 68 and call for a rapid travel in reverse to a specified displacement beyond the face of the workpiece. However immediately with the de-energization of coil 68, the coils 71, 77 and 87 are also de-energized and with the contactor 81 opening, the solenoid circuit 80 is caused to exhaust the power cylinder 34. The coil spring 53 immediately takes over and actuates the slide 48 downwardly to cause pawl 56 to index the ratchet and cam mechanism thus moving the cam projection 64 from contact with roller 29 and into contact with a recess 66. Accordingly the arms 24 and 16 are rocked to withdraw or back out the cutting tool 20. Thus the tool can be moved to the rear to a displacement as specified by the tape in preparation for the next pass.

Upon the tool reaching a position to the right just beyond the workpiece FIG. 1, a tape advance is again initiated and the tool moves to the left for a specified distance as set by the tape. Then another tape advance occurs and this next block sensed by the tape reader will call for a pick up of the thread feed for a short distance whereupon an accurate drop out of the feed occurs all as described and in the manner as described for the first pass.

The second pass will differ from the first pass only in that the energization of coil 77 and closing of the contactor 81 to energize the solenoid circuit 80 will index the cam 63 to bring another cam projection into contact with roller 29. This second cam projection will be higher than the first by several thousands of an inch and thus the tool is projected inwardly to a greater extend for cutting a deeper cut. On each succeeding pass the tool is extended inwardly to a greater extent for cutting progressively deeper cuts in the thread until the proper depth of thread is reached. This ends the thread cutting operation and the next tape advance will be to an out position whereupon another tape advance will index the turret for other operations.

WHAT IS CLAIMED IS

1. In mechanism for cutting threads on a workpiece supported for rotation by the spindle of a tape controlled turret machine, in combination, a turret supported threading head adapted to have horizontal reciprocating movement to and from the spindle supported workpiece, a tool holder shaft mounted by the threading head for oscillating movement, a cutting tool carried by the tool holder shaft and adapted for engagement with the workpiece when the tool holder shaft is oscillated in one direction and to be withdrawn from the path of the workpiece when the shaft is oscillated in a reverse direction, an actuating lever carried by the threading head and operatively connected to the tool holder shaft, whereby rocking movement of the lever in one direction will oscillate the tool holder shaft to position the cutting tool for engagement with the workpiece and whereby rocking movement of the lever in a reverse direction will withdraw the tool from the path of the workpiece, ratchet and cam mechanism carried by the threading head and having coaction with the actuating lever to produce rocking movement of the lever, a power cylinder carried by the threading head and having a reciprocating piston, and means operatively connecting the piston of said power cylinder with the ratchet of the ratchet and cam mechanism, whereby the ratchet and cam mechanism is indexed for each reciprocating movement of the piston to produce rocking movement of the lever.

2. In mechanism for cutting threads as defined by claim 1, additionally including a pair of pawls in associated relation with the ratchet and cam mechanism for indexing the same, reciprocable slide plate means carrying the pawls, and a pivoted rocker arm connecting the piston of the power cylinder with the reciprocable slide plate means.

3. In mechanism for cutting threads as defined by claim 1, additionally including a pair of pawls in associated relation with the ratchet of the ratchet and cam mechanism for indexing the same, a reciprocable slide plate member carrying the pawls, whereby one pawl is operative for indexing the ratchet and cam mechanism when the slide plate member is reciprocated in one direction and whereby the other pawl is operative when the slide plate member is reciprocated in the reverse direction, a pivoted rocker arm connecting the piston of the power cylinder with the reciprocating slide plate member, spring means for maintaining the actuating lever in contact with the cam of the ratchet and cam mechanism, and additional spring means connected between the rocker arm and the threading head and operative for returning the piston of the power cylinder from an extended position of the same to a withdrawn position when the pressure medium is released.

4. In a tape controlled machine of the character described for cutting threads on a workpiece supported for rotation by the spindle of the machine, a turret supported threading head adapted to have horizontal reciprocating movement to and from the spindle supported workpiece, a tool holder shaft mounted by the threading head for oscillable movement, a thread cutting tool adapted for movement with respect to the workpiece as controlled by the tool holder shaft, ratchet and cam mechanism carried by the threading head and adapted to have indexing movement for oscillating the tool holder shaft whereby to effect movement of the cutting tool towards and from the workpiece, means for indexing the ratchet and cam mechanism, and the cam of said ratchet and cam mechanism having cam projections of different projecting extent, whereby the cutting tool is positioned by the ratchet and cam mechanism for a depth of cut on a thread cutting pass as determined by the projecting extent of the cam projection as may be rendered operative by a particular indexed position of the ratchet and cam mechanism.

5. In a tape controlled machine of the character as defined by claim 4, additionally including a power cylinder carried by the threading head and having a piston adapted to reciprocate upon admission and exhaustion of a pressure medium as regards said power cylinder, and wherein the means for indexing the ratchet and cam mechanism includes a slide plate member also mounted by the threading head for reciprocating movement and having operative connection with said piston, and pawls carried by the slide plate member for indexing the ratchet and cam mechanism upon each reciprocation of the slide plate member as effected by a reciprocating stroke of the piston.

6. In a tape controlled machine of the character as defined by claim 4, additionally including a power cylinder carried by the threading head and having a piston adapted to reciprocate to and from a retracted and an extended position, wherein the means for indexing the ratchet and cam mechanism includes a slide plate member also mounted by the threading head for reciprocating movement, a pivoted rocker arm connecting the piston of the power cylinder with the reciprocable slide member, a pair of pawls carried by the slide plate member and operative to index the ratchet and cam mechanism upon reciprocating movement of the slide plate member, and spring means connected between the rocker arm and the threading head and operative for returning the piston of the power cylinder from an extended position of the same to a retracted position when the pressure medium is released.

7. In thread cutting apparatus, the combination including a horizontally reciprocable turret head and a rotatable workpiece carried by the spindle of the apparatus, an oscillable tool holder shaft carried by the turret head and which positions a cutting tool for cutting a thread on the periphery of the workpiece, a power cylinder carried by the turret head and having a piston reciprocable to and from a retracted and an extended position, means for effecting oscillation of the tool holder shaft for positioning the cutting tool for a thread cutting operation and for withdrawing the tool at the end of said operation, said means including a ratchet and cam combination mounted for indexing rotation, and means operatively connecting the ratchet of said ratchet and cam combination with the piston of the power cylinder, whereby the ratchet and cam combination is indexed for each reciprocating stroke of the piston.

8. In thread cutting apparatus as defined by claim 7, wherein the cam of said ratchet and cam combination is provided with a plurality of cam projections of different projecting extent and which are spaced around the periphery of the cam, and wherein the cam is indexed for each stroke of the piston a distance equal to one-half the distance between adjacent projections.

* * * * *